US010133046B2

(12) United States Patent
Kalkbrenner et al.

(10) Patent No.: US 10,133,046 B2
(45) Date of Patent: Nov. 20, 2018

(54) OPTICAL ARRANGEMENT AND LIGHT MICROSCOPE

(71) Applicant: Carl Zeiss Microscopy GmbH, Jena (DE)

(72) Inventors: Thomas Kalkbrenner, Jena (DE); Gerhard Krampert, Jena (DE); Ralf Netz, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 14/425,416

(22) PCT Filed: Aug. 2, 2013

(86) PCT No.: PCT/EP2013/066314
§ 371 (c)(1),
(2) Date: Mar. 3, 2015

(87) PCT Pub. No.: WO2014/040800
PCT Pub. Date: Mar. 20, 2014

(65) Prior Publication Data
US 2015/0253559 A1   Sep. 10, 2015

(30) Foreign Application Priority Data

Sep. 11, 2012   (DE) .......................... 10 2012 017 922

(51) Int. Cl.
*G02B 21/06* (2006.01)
*G02B 21/00* (2006.01)
(Continued)

(52) U.S. Cl.
CPC ........... *G02B 21/06* (2013.01); *G02B 5/1814* (2013.01); *G02B 21/0032* (2013.01);
(Continued)

(58) Field of Classification Search
CPC .............. G02B 5/1814; G02B 21/0032; G02B 21/0092; G02B 21/06
(Continued)

(56) References Cited

U.S. PATENT DOCUMENTS 4,769,551 A * 9/1988 Hamashima ........ G03F 7/70358
250/548
7,362,449 B2 * 4/2008 Dubois .................. G01B 9/021
356/515
(Continued)

FOREIGN PATENT DOCUMENTS

DE      102 57 237 A1     6/2003
DE   10 2007 018048 A1    10/2008
(Continued)

OTHER PUBLICATIONS

English machine translation of JP 2007199571 A.*
(Continued)

*Primary Examiner* — Nicholas R Pasko
(74) *Attorney, Agent, or Firm* — Duane Morris LLP

(57) ABSTRACT

An optical arrangement for being positioned in a beam path of a light microscope, having at least a first and a second optical assembly for providing structured illumination light from incident light. The optical arrangement provides for light to be guided over different beam paths to the various optical assemblies and in the direction of a sample. Electronic control means are provided and designed to illuminate, in each case, a beam path from the different beam paths to different optical assemblies at a point in time, in that at least a first beam combination mirror is provided for guiding light coming from various optical assemblies to a common beam path in the direction of a sample. The first beam combination mirror has reflective areas on which only light from one of the two optical assemblies is incident and has the light-permeable areas of the beam combination mirror in (Continued)

which only light from the other of the optical assemblies is incident. The invention further relates to a light microscope having an optical arrangement according to the invention.

20 Claims, 2 Drawing Sheets

(51) Int. Cl.
| | |
|---|---|
| G02B 21/36 | (2006.01) |
| G02B 27/58 | (2006.01) |
| G02B 5/18 | (2006.01) |
| G02B 21/02 | (2006.01) |
| G02B 21/04 | (2006.01) |

(52) U.S. Cl.
CPC ..... *G02B 21/0076* (2013.01); *G02B 21/0092* (2013.01); *G02B 21/025* (2013.01); *G02B 21/04* (2013.01); *G02B 21/367* (2013.01); *G02B 27/58* (2013.01)

(58) Field of Classification Search
USPC ........ 359/385–389, 629, 636; 351/207, 211, 351/214, 237
See application file for complete search history.

(56) References Cited

U.S. PATENT DOCUMENTS

| | | | | |
|---|---|---|---|---|
| 7,405,874 | B2* | 7/2008 | Hecker | G02B 21/084 |
| | | | | 359/368 |
| 7,485,875 | B2* | 2/2009 | Wolleschensky | G01N 21/6458 |
| | | | | 250/458.1 |
| 7,642,536 | B2* | 1/2010 | Baer | G01N 21/6458 |
| | | | | 250/584 |
| 7,701,632 | B2* | 4/2010 | Wolleschensky | G01J 3/02 |
| | | | | 359/386 |
| 7,755,063 | B2* | 7/2010 | Baer | G02B 21/0056 |
| | | | | 250/458.1 |
| 7,820,958 | B2* | 10/2010 | Ishihara | G01N 21/6445 |
| | | | | 250/234 |
| 7,848,017 | B2* | 12/2010 | Ouchi | G02B 21/14 |
| | | | | 359/384 |
| 7,969,652 | B2* | 6/2011 | Nakayama | G02B 21/16 |
| | | | | 359/370 |
| 8,289,622 | B2* | 10/2012 | Loriette | G02B 21/0032 |
| | | | | 359/370 |
| 2009/0219607 | A1* | 9/2009 | Saggau | G02B 21/0016 |
| | | | | 359/305 |
| 2009/0250632 | A1* | 10/2009 | Kempe | G01N 21/6458 |
| | | | | 250/459.1 |
| 2010/0108873 | A1 | 5/2010 | Schwertner | |
| 2010/0118394 | A1* | 5/2010 | Hecker | G02B 21/084 |
| | | | | 359/385 |
| 2011/0194175 | A1* | 8/2011 | Dougherty | G01N 21/6458 |
| | | | | 359/386 |
| 2012/0026311 | A1 | 2/2012 | Ouchi | |
| 2012/0097865 | A1* | 4/2012 | Lippert | G01N 21/6458 |
| | | | | 250/459.1 |
| 2012/0112095 | A1* | 5/2012 | Baer | G02B 21/0072 |
| | | | | 250/459.1 |
| 2012/0182413 | A1* | 7/2012 | Guo | G02B 21/06 |
| | | | | 348/79 |

FOREIGN PATENT DOCUMENTS

| | | |
|---|---|---|
| JP | 2003 248175 A | 9/2003 |
| JP | 2005 205469 A | 8/2005 |
| JP | 2007 199397 A | 8/2007 |
| JP | 2007 199571 A | 8/2007 |
| JP | 2007199571 A * | 8/2007 |
| JP | 2007 279287 A | 10/2007 |
| JP | 2012 078802 A | 4/2012 |
| WO | WO 96/24082 | 8/1996 |
| WO | WO 2012/118436 A1 | 9/2012 |
| WO | WO 2012118436 A1 * | 9/2012 ............ G02B 21/06 |
| WO | WO 2012 049831 A1 | 2/2014 |

OTHER PUBLICATIONS

English translation of Notification of Transmittal of Translation of the International Preliminary Report on Patentability (Chapter I or Chapter II).

Gustafsson, Mats G.L., et al; "Doubling the lateral resolution of wide-field fluorescence microscopy using structured illumination"; Proceedings of SPIE 2000; 3919:141-150.

Heintzmann, R., et al.; "Laterally Modulated Excitation Microscopy: Improvement of resolution by using a diffraction grating"; SPIE 1998; 3568: 185-196.

Heintzmann, Rainer, et al.; "Saturated patterned excitation microscopy—a concept for optical resolution improvement"; J. Opt. Soc. Am. A. 2002; 19(8):1599-1609.

Lukosz, von W, et al.; "Optischen Abbildung unter Uberschreitung der beugungbedingten Auflosungsgrenze"; Physikalisches Institut, Technische Hochschule 1963; 241-255.

Shao, Lin, et al.; "Super-resolution 3D microscopy of live whole cells using structured illumination"; Nature Methods 2011; 8(12):1044-1046.

Japanese Office Action with English language translation.

* cited by examiner

OPTICAL ARRANGEMENT AND LIGHT MICROSCOPE

RELATED APPLICATIONS

The present application is a U.S. National Stage application of International PCT Application No. PCT/EP2013/066314 filed on Aug. 2, 2013 which claims priority benefit of German Application No. DE 10 2012 017 922.7 filed on Sep. 11, 2012, the contents of each are incorporated by reference in their entirety.

FIELD OF THE INVENTION

In a first aspect, the present invention relates to an optical arrangement for positioning in a beam path of a light microscope, and in further aspect, the invention relates to a light microscope.

BACKGROUND OF THE INVENTION

A generic light microscope comprises a sample plane, which a sample to be analyzed can be placed upon and at least one light source for emitting light in the direction of the sample plane. Light coming from the sample can then be detected by means of a detection device for capturing a sample image.

Structured illumination microscopy (SIM) is an established method for analyzing a sample with high resolution. In so doing, a sample is illuminated with structured illumination light. This can mean any light having a spatially variable intensity distribution across the cross-section of the beam. In particular, light having a period intensity distribution across the cross-section can be used, for example a line pattern with lines that are illuminated and lines that are not illuminated.

A generic optical arrangement that is incorporated into a beam path of the light microscope between the light source and the sample plane can be used for generating structured illumination. The generic optical arrangement comprises at least a first and a second optical assembly for providing structured illumination light from incident light.

The optical assemblies can for instance be gratings. Successive representations of the gratings are generated in the sample plane. Sample images of various grating orientations are captured, which can be used to calculate a sample image with extended resolution.

Said extended resolution represents a considerable advantage compared to the conventional capture of wide-field images without structured illumination. However, more time is required to capture an image with structured illumination. Therefore, it can be considered a fundamental objective to keep the time required for capturing an image low. In so doing, the instrument-based set-up should be realizable as efficiently as possible and be economical.

Known optical arrangements do not meet these requirements.

For example, it is known to use a single grating for the representation of various grating orientations on the sample, and to rotate said grating into various orientations. Moreover, an optical image field rotator can be used behind the grating, for example an Abbe-Koenig prism. It can be used to rotate the image and hence to achieve a rotation of the grating representation on the sample plane. However, the rotation of a grating or an image field rotator is relatively time-consuming. In addition, interfering reflections of diffracted light may potentially occur.

Alternatively, optical beam splitting may be used to generate the interfering beams; yet, this approach can be complicated in terms of required instruments and problematic with regard to stability.

Furthermore, it is known to provide superpositioned gratings with different orientations on a substrate. Light of a desired order of diffraction is guided to the sample, while other orders of diffraction are hidden. However, this results in a high loss of intensity.

Finally, a plurality of gratings with different orientations may also be provided. They are selected in succession by a motor-driven grating changer. But again, the time required to change between the gratings is high.

All in all, known optical arrangements are associated with a high lag time for changing between two grating orientations and/or high mechanical requirements, for instance with regard to a high positioning capability of movable optical components. In addition, undesirable losses of intensity of the illumination light may occur.

SUMMARY OF THE INVENTION

One of the objects of the invention is illustrated in the provision of an optical arrangement and a light microscope, in which a good image quality and an efficient change between various grating representations for generating structured illumination light can be achieved and which has a simple design.

This object is achieved in the optical arrangement and the light microscope having the characteristics set forth in the claims.

Preferred embodiment variants of the optical arrangement according to the invention and the light microscope according to the invention are the subject of the dependent claims and are explained in the following description, in connection with the figures.

The optical arrangement of the invention includes light which is guided over different beam paths to the various optical assemblies in the direction of a sample. Electronic control means are provided and designed to illuminate, in each case, one beam path of the different beam paths to various optical assemblies at a point in time. At least a first beam combination mirror is provided for guiding light coming from various optical assemblies to a common beam path in the direction of a sample. The first beam combination mirror has reflective areas, in which only light from one of the two optical assemblies is incident upon, and the first beam combination mirror has light-transmitting areas, in which only light from the other of the optical assemblies is incident upon.

According to the invention, an optical arrangement according to the invention is provided between a light source and a sample plane in a light microscope of the type mentioned above.

In the invention, no movement of the optical assembly is required to select an optical assembly for providing structured illumination light. In contrast to conventional optical arrangements, an optical assembly is therefore not selected by being moved into a stationary beam path. In fact, light can be guided to the optical assemblies across spatially different beam paths. The time required to select one of said beam paths can be very low with a direction of the deflection for light.

Only one of the different beam paths to one of the optical assemblies each is illuminated at any given time. As the beam paths are illuminated in succession, it is possible to generate structured illumination with various orientations and/or phase shifting at the sample plane. One or a plurality of images of the sample can be captured for each of the beam paths, said images being used to calculate an image with extended resolution.

Further, in the invention at least one beam combination mirror is provided for uniting the different beam paths, which comprise the various optical assemblies, said beam combination mirror reflective areas and differing various light-transmitting areas across its cross-sectional area. In contrast to conventional polarizing cube beam splitters or neutral beam splitters for combining beams, light losses are considerably lower with the beam combination mirrors of the invention. In comparison with switchable mirror galvanometers for uniting beams, the beam combination mirrors can be operated without any or with only very minor electronic expenditures.

Each beam combination mirror is arranged outside of planes that are optically conjugated relative to the sample plane. If gratings are used, for example in an optically conjugated plane relative to the sample plane for generating structured illumination light, light is diffracted into various orders of diffraction on said gratings and guided onto the first beam combination mirror. In so doing, light is only incident upon certain areas of the beam combination mirror, said areas being determined by the orders of diffraction on the gratings. The orientation of a grating determines the position of the first order of diffraction of light on the first beam combination mirror. With a plurality of grating representations having different orientations, light components of the first order of diffraction of the various grating representations in a common beam path are therefore not overlapping. As a result, it is possible to combine a plurality of beam paths with very low light losses thanks to the reflective areas and the light-transmitting areas of the beam combination mirror. Furthermore, no mechanical movement is advantageously required for combining the various beam paths.

In a preferred embodiment of the optical arrangement according to the invention, the optical assemblies each comprise a grating. In principle, reflective gratings are also possible, although transmission gratings are preferable. The gratings can be arranged in different orientations to each other for the generation of structured illumination light. This means that the directions of the grating bars of various gratings are rotated to each other around the main direction of propagation of the incident light.

In addition to a grating, optical assemblies can in each case also comprise an image field rotator. Said device rotates the image of the associated grating at the sample plane by a defined angle. In so doing, one of the optical assemblies can be formed by a single grating, while all remaining optical assemblies are formed in each case with a grating and an—in particular stationary—image field rotator.

The orientation and/or phase position of the generated structured illumination light can differ when structured illumination is provided by various optical assemblies. For instance, the structured illumination light can create a line pattern at the sample plane. In this case, the orientation determines the direction of the lines. In so doing, the phase or phase position of the structured illumination marks the position of the lines in a direction perpendicular to the gradient of the lines.

In another embodiment variant of the optical arrangement according to the invention, a single grating may be sufficient. Herein, a grating for generating structured illumination light is arranged in a common beam path in front of the different beam paths to the various optical assemblies. The optical assemblies in each case comprise a stationary—image field rotator, wherein structured illumination light is provided in different orientations with different image field rotators.

In a preferred embodiment of the optical arrangement according to the invention, it is provided that at least a third optical assembly for generating structured illumination light from incident light is present, that a second beam combination mirror is present for guiding light, which is coming from the second and third optical assembly, onto a common beam path to the first beam combination mirror, that the second beam combination mirror comprises reflective areas, in which only light from the second optical assembly is incident upon, and light-transmitting areas, in which only light from the third optical assembly is incident upon, or vice versa. If the at least three optical assemblies generate structured illumination light in different orientations, an increase in the resolution can be achieved in all directions within the sample plane. For each further optical assembly having a separate beam path, a further beam combination mirror can be provided. Its reflective and light-transmitting areas are designed analogously to the first and second beam combination mirror. In so doing, the reflective areas of various beam combination mirrors are offset to each other in a plane perpendicular to the optical axis, along which the light is spreading between the beam combination mirrors. In particular, the reflective areas of various beam combination mirrors can be rotated to each other around the optical axis. In so doing, an angle of rotation between beam combination mirrors can be equal to an angle of rotation between various orientations of the grating representations.

To keep light losses at the beam combination mirrors as low as possible, the overlap of light of a grating across the cross-sectional area of a beam combination mirror with light of another grating should be kept to a minimum. For this purpose, all beam combination mirrors are arranged outside of planes that are optically conjugated to the planes of the gratings.

One of the beam combination mirrors is preferably arranged in a plane, in which a light distribution is defined as Fourier transform of the light distribution on the gratings. Alternatively, two beam combination mirrors can be arranged on different sides of said plane. If the gratings are located in an intermediate image plane of the light microscope, the mentioned plane consequently is the pupil plane of the light microscope.

To ensure that the same sample area is analyzed by structured illumination light of various gratings, the various beam paths are united on a common beam path by the beam combination mirrors. As a result, light of a zero order of diffraction is incident upon the same area of a beam combination mirror. The first beam combination mirror is arranged such that light, which is diffracted into a zero order of diffraction and guided across the beam path of the first optical assembly, is incident upon a central area of the first beam combination mirror and that light, which is diffracted into a zero order of diffraction and guided across the beam path of the second optical assembly, is incident upon the central area, wherein the central area is partially reflecting. Thus, light of the zero order of diffraction is in each case transferred partially from the first beam combination mirror in the direction of the sample by various gratings. Partially reflecting shall mean that part of the incident light is transmitted and part is reflected. Light absorption should be as low as possible. The degree of partial reflection is preferably selected such that light from various gratings or optical assemblies is transmitted to similar, in particular identical, parts in the direction of the sample. Accordingly, when all beam combination mirrors are viewed together, light losses through the beam combination mirrors are the same for all beam paths leading to various optical assemblies.

In an analogous fashion, it can be provided that all remaining beam combination mirrors similarly comprise a partially reflecting central area. In particular, the second beam combination mirror can be arranged such that light, which is diffracted into a zero order of diffraction and guided across the beam path of the second optical assembly, is incident upon a central area of the second beam combination mirror and that light, which is diffracted into a zero order of diffraction and guided across the beam path of the third optical assembly, is incident upon the central area of the second beam combination mirror. Hereby, the central area of the second beam combination mirror is partially reflecting and the central area of the first beam combination mirror preferably comprises a higher light transmitting capacity than the central area of the second beam combination mirror. In other words, the degrees of partial reflection of the central areas of various beam combination mirrors vary and can be selected such that light of the zero order of diffraction is guided from various optical assemblies at equal ratios or with identical light intensities in the direction of the sample through the beam combination mirrors.

If a plurality of beam combination mirrors is arranged in series, the degrees of reflection and light transmitting capacities of the central areas are preferably selected as follows: the very back beam combination mirror, which is furthest away from the sample plane, can comprise a degree of reflection of ½ and analogously a light transmitting capacity of ½. The central area of the next beam combination mirror preferably has a degree of reflection of ⅓ and a light transmitting capacity of ⅔. Formulated in broad terms, an n-valued beam combination mirror when counted from the very back beam combination mirror preferably has a degree of reflection of 1/(n+1) and a light transmitting capacity of n/(n+1).

Due to undesirable absorption and scattering effects, the degrees of reflection and the light transmitting capacities can in practice, deviate from the values mentioned above, wherein the deviation should advantageously not exceed 20% of the respective value.

The sample should be illuminated with uniform light intensity whenever possible, irrespective of which of the beam paths to the various optical assemblies is selected for illumination. For this purpose, the reflective and the light-transmitting areas of the beam combination mirrors can be arranged and the light transmitting capacities of the central areas of the beam combination mirrors selected such that the light losses at the beam combination mirrors, in percent relative to the input intensity, are equal for luminous beams originating from various optical assemblies. In so doing, the input intensity can be determined before the passage through the respective optical assembly.

For the generation of grating representations with various orientations on the sample plane, it can be provided that the optical assemblies are image field rotators and/or gratings in various orientations to each other. Because of the various orientations, light diffracted in a first order of diffraction by the first grating, and light diffracted in a first order of diffraction by the second grating is incident upon different areas on the first beam combination mirror. Said different areas are formed by the reflective and light-transmitting areas, such that light of the first order of diffraction is transferred in the direction of the sample plane by both the first grating as well as the second grating.

A reflective area should be as completely reflective as possible and can comprise for example a degree of reflection of greater than 80% or 90%. Analogously, the light-transmitting areas, which can also be created by a continuous light-transmitting area, should be as completely light-transmitting as possible and can transmit for example at least 80% or 90% of incident light. In contrast, a central area should comprise a smaller degree of reflection than the reflective areas and a lower light transmitting capacity than the light-transmitting areas.

In the described embodiments, the fact that the position of light of a first order of diffraction is dependent upon an orientation of the associated grating and an image field rotator possibly arranged behind it is utilized for uniting the beams. Each beam combination mirror preferably comprises two reflective areas arranged opposite from each other toward the central area. In order to allow the transmission of light of the first order of diffraction from other gratings, the two reflective areas of a beam combination mirror do not form a closed ring area. In fact, they cover at most a share of 1/N of said type of ring area with a number of beams to be united of N.

In order to allow the capture of a sample image with extended resolution within the shortest possible period of time, switching between the different beam paths to various optical assemblies should be possible within a short period of time. An adjustable deflection device is preferably provided for selecting a beam path to be illuminated, with which light can be selected and deflected to one of the optical assemblies. The deflection device preferably comprises a deflection mirror, which can be rotated and/or shifted. The deflection mirror can be designed for example as a micro-electromechanical system (MEMS) or a galvanometer-based scanning mirror. This helps achieve considerable time savings when switching between various beam paths to be illuminated, in particular when compared with conventional optical arrangements, in which the optical assembly proper is moved into the beam path.

The deflection mirror can have a lower mass and smaller dimensions than the optical assemblies, thus enabling a faster adjustment. Furthermore, the required change in position is smaller for the deflection mirror than in the case where an entire optical assembly is moved in or out of the beam path.

In principle, light can be guided from the deflection device to the various optical assemblies as a free beam, i.e., without the use of optical waveguides. However, optical waveguides are preferably provided. In so doing, the deflection device is set up for guiding light in an adjustable manner onto one of the optical waveguides and further to one of the optical assemblies. Optical waveguides preferably guide light in a non-imaging fashion, whereby lenses with smaller cross-sectional surface areas can be used. In particular, the deflection mirror can be designed with a smaller size, enabling faster switching times.

In a preferred embodiment, the optical waveguides are polarization-conserving and each optical waveguide is arranged in an axial rotational orientation, in which a direction of polarization of emerging light is perpendicular to a direction of the grating bars of a grating, which the light that is emerging from the respective optical waveguide is incident upon. The axial rotational orientation should be understood as being an angle of rotation around a main direction of propagation of emerging light. A particularly high modulation contrast can be achieved in the sample plane by adjusting the direction of polarization of the light depending on the orientation of the grating which the light is being guided to.

In principle, the extent of light losses on various optical waveguides can vary. This can be due for instance to various angles of impact of light originating from the direction of deflection. Nevertheless, the intensity of emerging light should be as uniform as possible for all optical waveguides. To achieve this, it can be provided that an acousto-optic device is present in front of the optical waveguides and that the electronic control means are set up for the purpose of varying the light intensity by means of the acousto-optic device depending on which optical waveguide the light is being transferred to, such that an identical intensity of light is emitted with all optical waveguides or such that luminous beams behind the beam combination mirrors, that is, between the beam combination mirrors and the sample plane, which originate from various optical assemblies, have an identical intensity of light. Settings for the acousto-optic device, which are conducive for this purpose, can be determined in advance in a test measurement. The intensity can be adjusted in a particularly short period of time preferably with an acousto-optic device, for example an acousto-optic tunable filter (AOTF). If this takes place during a switching time of the deflection device, a measurement interruption time, which is due to the rearrangement of the deflection device, is not extended.

In principle, a separate optical fiber can be provided for each of the beam paths to various optical assemblies. However, light can also be selected by way of an individual optical fiber and guided to one of two optical assemblies through polarization coding. As a result, fewer optical fibers can be present than beam paths to various optical assemblies. With said embodiment, it is provided that light on a first as well as a second beam path can be deflected to a first optical fiber by means of the deflection device, that polarization-changing means for generating a direction of polarization of light are arranged in the first beam path, said direction being perpendicular to a direction of polarization of light on the second beam path, that a polarizing cube beam splitter for uniting the first and the second beam path is present, that the first optical fiber is arranged such that the beam path united by the polarizing cube beam splitter hits the first optical fiber and that a polarizing beam splitter is arranged behind the first optical fiber, said polarizing beam splitter guiding the light onto a beam path to a defined optical assembly or onto another beam path to another of the optical assemblies, depending on its direction of polarization. In principle, any means that unite light from different directions and vertical polarization on a common beam path can be used as polarizing cube beam splitters.

Polarization changing means can be arranged on one or on both of the beam paths between the polarizing beam splitter and the two optical assemblies. Said polarization changing means can for instance comprise a λ/2 plate, which is arranged in an angle of rotation through which a direction of polarization of passing light is perpendicular to a direction of the grating bars of the grating behind the λ/2 plate.

To calculate a high-resolution image using structured illumination, a plurality of sample images are advantageously captured with differently oriented grating representations as well as a plurality of images in which a grating representation is shifted while the orientation remains the same, i.e. it is out-of-phase. Grid representations with various orientations are preferably generated by way of the gratings and/or image field rotators of the various optical assemblies. A phase shift can be carried out by shifting the optical assemblies.

It is preferred that adjustment devices for moving the optical assemblies independently of each other are provided in order to change a structured illumination, which is provided with one of the optical assemblies, and that the electronic control means are set up for the purpose of moving one of the optical assemblies, while a beam path to another of the optical assemblies is selected, in order to reduce the measurement interruption time. Sample images in direct succession are thus captured across different beam paths and consequently for grating representations with various orientations rather than for various phase shifts across the same beam path.

The adjustment devices can consist of motors, preferably comprising actuators such as for example piezoelectric actuators, or galvanometers. For the phase shift, the optical assemblies are displaced diagonally to a line direction of the grating to be represented in each case. In principle, the optical assemblies can also be rotated in order to rotate a representation of a grating orientation. Hereby, it can be provided that the beam combination mirrors are rotated in the same manner.

For the phase shift of a structured illumination provided with one of the optical assemblies, at least one phase plate can also be present, which can be adjusted to various settings in which it has different effects on a phase of structured illumination light. The phase plate can be designed as a movable optical refractive medium. For instance, a wedge can be provided, which is displaced for the phase shift. Alternatively, a plane-parallel plate can be present, which is tilted for the phase shift. Furthermore, a plate having a liquid crystal area can be used, which is switchable for the phase shift.

In principle, a single phase plate arranged in the beam path behind the beam combination mirrors is sufficient for the phase shift. However, a phase plate is preferably provided behind each optical assembly. This enables an exemplary embodiment of the optical arrangement according to the invention, in which the electronic control means are set up for the purpose of rearranging one or a plurality of the phase plates provided in the beam path of a defined optical assembly in order to reduce a measurement interruption time, while a beam path to another optical assembly is selected.

The time required for the phase shift with a phase plate is typically 12 ms. However, the control described above can achieve measuring interruption times that are considerably lower than 12 ms and they can potentially be determined by a switching time of the deflection mirror alone. Said time can be in the range of a few milliseconds, for example 2 ms.

In order to generate a number of differently oriented grating representations that is larger than the numbers of beam paths provided to various optical assemblies, an image field rotator can be present in the beam path behind the beam combination mirrors. Said image field rotator changes an orientation of the structured illumination, which is provided with the optical assemblies. Furthermore, an adjustment device for rotating the image field rotator is provided.

In order to likewise enable measurements without structured illumination, the electronic control means can be set up for the purpose of deflecting light onto a beam path in order to provide a wide-field illumination, said beam path being free of gratings. Hereby, means are provided for the alternative guidance of light for wide-field illumination and of light emerging from gratings onto a common beam path in the direction of the sample. Said means can comprise a partially reflecting mirror, a polarization-dependent mirror and/or a polarizing cube beam splitter. A movable mirror can be used as well, such as for example a galvanometer-based scanning mirror or an MEMS mirror. In this case, the electronic control means are set up for the purpose of adjusting the movable mirror either to a position in which light is guided from the beam path without any grating to the sample plane, or to a position in which light is guided from the gratings in the direction of the sample plane.

In a further preferred embodiment of the optical arrangement according to the invention, a zoom lens for adjusting the illumination of an object lens of the light microscope is present in the beam path behind the beam combination mirrors. The zoom can be adjusted automatically by way of electronic control means, depending on an object lens incorporated in the beam path.

In principle, the illumination can also be adjusted by changing the gratings instead of using a zoom lens. For this purpose, replacement gratings can be arranged outside a plane that is defined by the different beam paths to various optical assemblies. Said replacement gratings can then replace a currently used grating by way of a motorized grating changer.

A motorized grating changer can also be provided to replace the optical assemblies with further sets of gratings. In so doing, the gratings of varying sets can have different grating constants.

In a preferred embodiment of the light microscope according to the invention, each grating is arranged in a plane that is optically conjugated relative to the sample plane. In so doing, it is particularly preferred that one of the beam combination mirrors is arranged in a pupil plane, or that two beam combination mirrors are arranged on varying sides of the pupil plane. If there are more than two beam combination mirrors, they are preferably arranged such that the pupil plane is positioned on or next to one of the beam combination mirrors in the center. This helps prevent to the greatest possible extent that light from various gratings is hitting the same area on a beam combination mirror. In particular light of the first order of diffraction can be guided onto areas of a beam combination mirror that are completely different from each other without overlap for various gratings.

The light microscope according to the invention can include a partially reflecting mirror, which reflects light emerging from the beam combination mirrors to a sample and transmits sample light emerging from the sample in the direction of a detection device. Said partially reflecting mirror can for example be a color splitter, which reflects or transmits light depending on the wavelength. The sample light can be fluorescent or phosphorescent light.

An arrangement between the beam combination mirror and the partially reflecting mirror can be used to reduce unwanted polarization changes. For example, the s and p ratios of polarized light can be affected differently by the reflection on the beam combination mirrors, resulting in an unwanted polarization change. The s and p ratios can now again be affected differently by the reflection on the partially reflecting mirror, as a result of which the unwanted change in polarization is at least partially compensated. In order to maintain a polarization of the light, this can be achieved with the arrangement of the beam combination mirrors and the partially reflecting mirror in the form of a periscope. Hereby, light behind the partially reflecting mirror can run parallel to light in front of the beam combination mirrors. In so doing, the reflection on the beam combination mirrors and the partially reflecting mirror can in each case bring about a light deflection of 90°.

For an embodiment with a simple mechanical design, the different beam paths to various optical assemblies are preferably positioned in one plane and parallel to each other. In this case, light to be transmitted to the sample on a very back beam combination mirror is guided from the beam path of a very back optical assembly by way of a fully reflective mirror to the very back beam combination mirror. The very back beam combination mirror shall mean the beam combination mirror located at the greatest distance away from the sample plane.

BRIEF DESCRIPTION OF THE DRAWINGS

Other characteristics and advantages of the invention are described below with regard to the enclosed schematic figures. In the figures.

DESCRIPTION OF THE EMBODIMENTS

Identical components and components with an identical effect are generally labeled with the same reference numbers in the figures.

Figure 1:
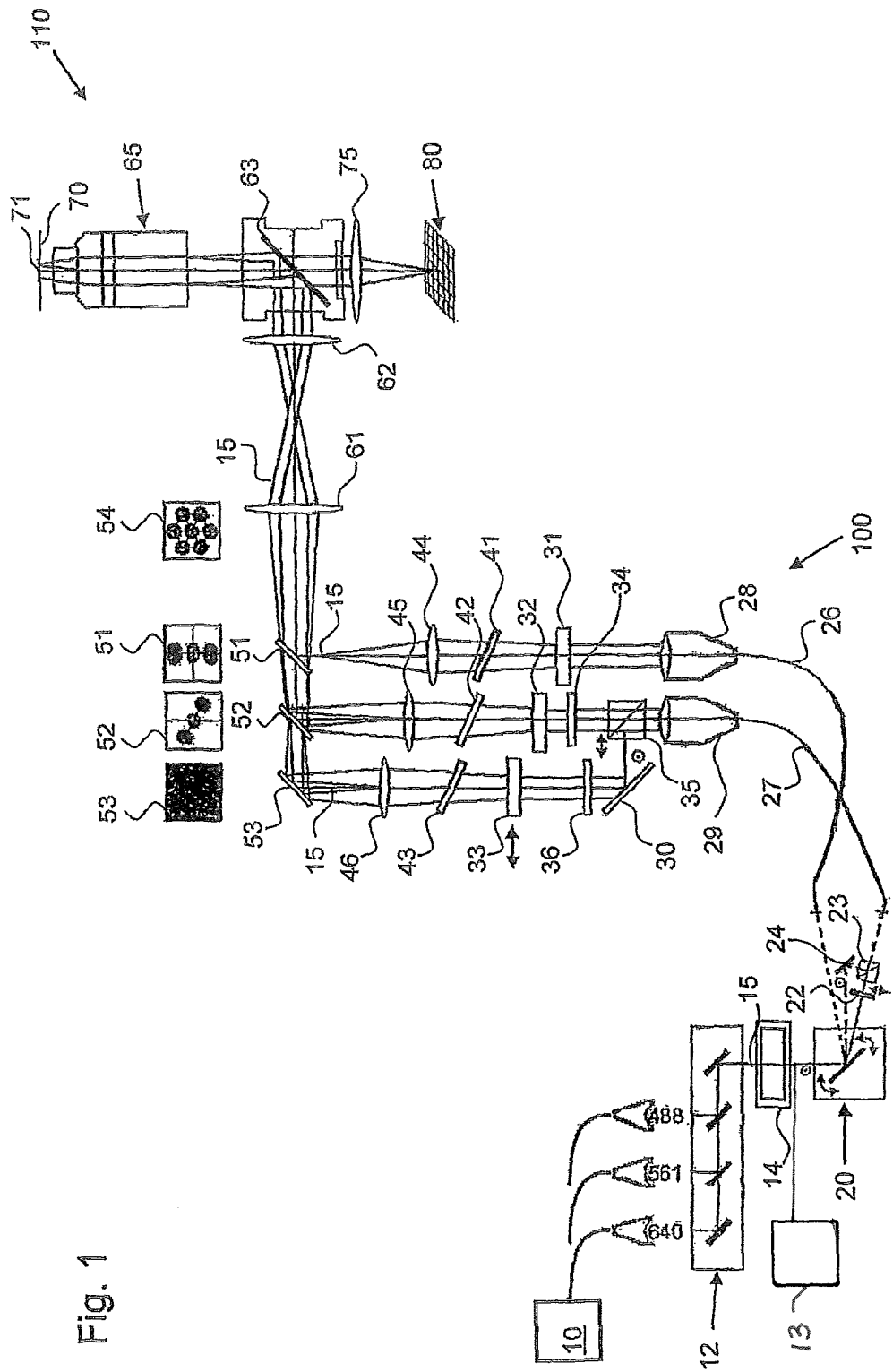
FIG. 1 shows a schematic representation of an exemplary embodiment of a light microscope according to the invention having an optical arrangement according to the invention.

An exemplary embodiment of a light microscope 110 according to the invention is illustrated in FIG. 1. The main components include a light source 10, an optical arrangement 100, which generates structured illumination light from the light 15 emitted by the light source 10, an object lens 65 for focusing the structured illumination light onto a sample plane 70 and for receiving sample light from the sample plane 70 as well as a detector device 80 for detecting sample light.

In the illustrated example, the light source 10 has a plurality of laser modules, which emit light or luminous beams 15 of varying wavelengths. In the description at hand, the terms light, luminous beams and rays of light can be deemed synonymous. Light 15 of the wavelengths 488 nm, 561 nm as well as 640 nm is plotted in FIG. 1.

The beam paths of the various laser modules are guided by way of a flight of mirror stairs 12 onto a common beam path to an acousto-optic tunable filter (AOTF) 14 of the optical arrangement 100. Light of a desired wavelength can be selected by way of the AOTF 14. Furthermore, the intensity of the light 15 can be adjusted, as described in more detail below.

The optical arrangement 100 has a deflection device 20, which is reached by light from the AOTF 14. The deflection device 20 comprises a deflection mirror 20, which can be adjusted to various rotational positions by means of electronic control means. Thanks to its small size and low mass, the deflection mirror 20 can be adjusted particularly quickly. As a result, it is advantageously possible to switch between various beam paths in a particularly short period of time, for instance within 2 ms. For this purpose, the deflection mirror 20 can in particular be designed as a micro-electro-mechanical system (MEMS) or as a galvanometer-based scanning mirror. A MEMS enables particularly short switch-over times, wherein a galvanometer-based scanning mirror provides a larger range of possible angles of deflection.

The optical arrangement 100 includes a plurality of optical assemblies 31, 32, 33 for providing structured illumination light of different orientations. They are arranged in beam paths that are different from each other. Each of said beam paths is selectable by way of different angles of deflection of the deflection device 20.

Optical fibers 26, 27 are provided in the illustrated example, for guiding the light 15 from the deflection device 20 to the various optical assemblies 31 to 33. Because light is guided in a non-image-forming fashion with optical fibers 26, 27, the deflection mirror 20 can be designed with a smaller size when using optical fibers 26, 27. This enables faster switch over times of the deflection mirror 20.

Polarized light is guided to the optical fibers 26, 27. Thus, the optical fibers 26, 27 are polarization-conserving.

In principle, one optical fiber can be present for each optical assembly 31 to 33. However, in the illustrated case, light is guided depending on the polarization either to the optical assembly 32 or to the optical assembly 33 by way of the same optical fiber 27. A polarizing cube beam splitter 23 is arranged in front of the optical fiber 27, said polarizing cube beam splitter guiding light of two different beam paths and different polarization to the optical fiber 27 on a common beam path. The two beam paths that are united by way of the polarizing cube beam splitter 23 can be selected by means of different angles of deflection of the deflection device 20. On one of said beam paths, light from the deflection device 20 reaches the polarizing cube beam splitter 23 by way of a mirror 24, without the direction of polarization of the light 15 changing. On the other beam path, light 15 hits polarization-changing means 22 before it reaches the polarizing beam splitter 23. Said means can for example comprise a λ/2 plate, which rotates the direction of polarization of the light 15 by 90°.

A direction of polarization of light 15 that is guided by way of the optical fiber 27 can thus be selected by way of various angles of deflection of the deflection device 20. A polarizing beam splitter 35 is arranged behind the optical fiber 27. The light 15 is transmitted or reflected depending on the direction of polarization and thus guided onto a beam path to the optical assembly 32 or onto a beam path to the optical assembly 33.

The beam paths of the various optical assemblies 31 to 33 are positioned in one plane and preferably parallel to each other. This is significant for uniting the beam paths behind the optical assemblies 31 to 33 with a low loss. To achieve that the beam paths of the optical assemblies 31 to 33 run parallel to each other, a mirror 30 can be provided, which deflects light reflected from the polarizing beam splitter 35 to the optical assembly 33.

In the illustrated case, the first optical assembly 31 has a first grating 31, the second optical assembly 32 has a second grating 32 and the third optical assembly 33 has a third grating 33. Each of the gratings 31 to 33 is arranged in an intermediate image plane. As a result, a structured illumination is generated, with which the grating structure of the respective selected grating 31 to 33 is clearly depicted in the sample plane 70.

Alternatively a single grating can also be provided, which is arranged in front of the deflection device 20. In this case, the optical assemblies 31 to 33 comprise image field rotators, through which the grating is depicted on the sample plane 70 in various orientations. In this case, the transfer takes place starting from the deflection device 20 without optical fibers.

In order for the representations of the gratings 31 to 33 to have a high modulation contrast at the sample plane 70, the direction of polarization of light 15 is preferably adjusted perpendicular to the vector of the grating, i.e., parallel to the direction of the grating rods of the respective grating 31 to 33.

In order to adjust the direction of polarization of the light 15 depending on a grating 31 to 33 to be illuminated, λ/2 plates 34, 36 can be provided in front of the gratings. Alternatively or in addition, the directions of polarization can also be defined by the axial rotational orientations of the optical fibers 26, 27 and/or the collimators 28, 29 connected with them, from which light 15 is exiting the respective optical fiber 26, 27. Consequently, the collimator 28 is rotated around the direction of propagation of the emerging light 15 such that the direction of polarization of the emerging light 15 is parallel to the grating rods of the first grating 31.

In a similar fashion, the collimator 29 is oriented such that the direction of polarization of emerging light 15 is parallel to the grating rods of the second grating 32. Finally, the direction of polarization of light 15 that is reflected on the polarizing beam splitter 35 should also be parallel to the direction of the grating rods of the grating 33. A λ/2 plate is arranged between the polarizing beam splitter 35 and the grating 33 for this purpose.

Preferably, the collimators 28, 29 in each case incorporate a zoom lens. Thus, similar optical fibers 26, 27 and collimators 28, 29 can also be used with various distances to the associated optical assemblies 31 to 33.

In order to unite the beam paths of various gratings 31 to 33, the optical arrangement 100 has a plurality of beam combination mirrors 51, 52. Light 15, which is diffracted by the first grating 31, reaches the first beam combination mirror 51 by way of a first focusing lens 44. In analogous fashion, light 15, which is diffracted at the second grating 32, reaches the second beam combination mirror 52 by way of a second focusing lens 45. Light 15, which is diffracted at the third grating 33, is fully reflected on a mirror 53, thus reaching the second beam combination mirror 52.

The beam combination mirrors 51 and 52 in each case have reflective areas and light-transmitting areas, which are arranged such that a portion of the light 15 that is as large as possible is transferred from the beam paths of the various gratings 31 to 33 to the sample.

Figure 3:
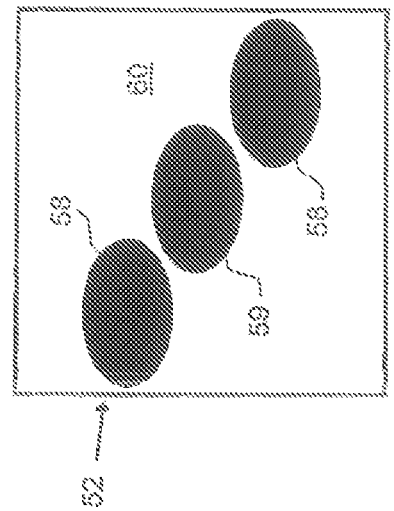
FIG. 3 shows a schematic representation of a second beam combination mirror of the optical arrangement.
Figure 2:
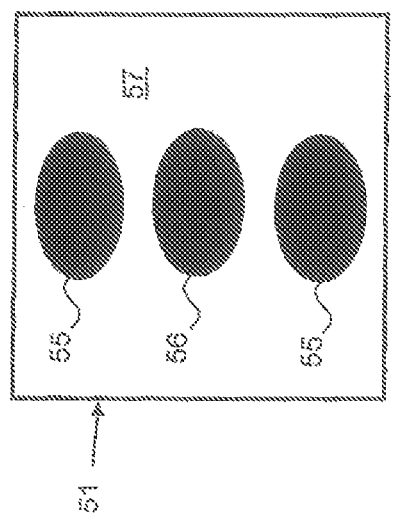
FIG. 2 shows a schematic representation of a first beam combination mirror of the optical arrangement.

A cross-section of the second beam combination mirror 52 is illustrated schematically in FIG. 3. The beam combination mirror 52 can for instance be formed by a light-transmitting substrate, with a reflective metal for creating reflective areas 58 deposited on certain positions of said substrate. The reflective and transmissive property can apply in particular to light of the visible, the infrared and/or the ultraviolet spectral range. The reflective areas 58 are arranged on positions reached by light 15, which is diffracted into a first order of diffraction at the second grating 32. By using line gratings with a fixed period, light is diffracted among other things into a negative first order of diffraction and a positive first order of diffraction, whereby light is diffracted into two different areas with respect to space. The orientation of said two areas with regard to the optical axis is dependent on the orientation of the grating. An orientation of the two reflective areas 58 relative to a central area 59 is therefore selected depending on the orientation of the second grating 32.

The orientation of the third grating 33 deviates from the one of the second grating 32. As a result, light 15 of the first order of diffraction of the third grating 33 is hitting other positions than the reflective areas 58 on the second beam splitter mirror 52. Said positions are formed by a light-transmitting area 60. As a result, light of the first order of diffraction can be transferred almost completely, for example at a percentage of more than 90%, from the second beam combination mirror 52 in the direction of the sample plane 70 by both the second grating 32 as well as the third grating 33.

Light 15 of the zero order of diffraction spreads along the optical axis for both the second grating 32 as well as the third grating 33, thus hitting a central area 59 of the second beam combination mirror 52. In order to partly transfer light 15 of the zero order of diffraction from both gratings 32, 33 in the direction of the sample plane 70, the central area 59 is partially reflective. For example, it is capable of reflecting and transmitting equal percentage ratios of light 15.

The reflective areas 58 and the central area 59 can be globular, for example elliptical. This takes into account that a circular beam cross-section on the beam combination mirrors, which are positioned at a slant to the direction where the light hits, is illuminating an elliptical surface area. The areas 58, 59 are preferably larger in a horizontal direction, which is positioned within a plane defined by the beam paths of the various gratings 31 to 33 than in a vertical direction hereto. The dimensions of the areas 58, 59 are preferably larger by 20 to 60% in the horizontal direction than in the vertical direction.

The light 15 transferred from the second beam combination mirror 52 in the direction of the sample plane 70 hits the first beam combination mirror 51. Said beam combination mirror is illustrated schematically in FIG. 1. The first beam combination mirror 51 likewise has at least one transmissive area 57, two reflective areas 55 and one partially reflecting central area 56. Said areas can be designed similar to the corresponding areas with the same name of the second beam combination mirror 52. However, the two reflective areas 55 are hereby arranged in a different angle of rotation relative to the central area 56 than the two reflective areas 58. A rotational orientation of the two reflective areas 55 within a surface of the beam combination mirror 51 is selected depending on the grating orientation of the first grating 31. Thus, light 15, which is diffracted by the first grating 31 into the first order of diffraction, is hitting the two reflective areas 55 and transferred in this fashion in the direction of the sample plane 70.

When it reaches the first beam combination mirror 51, the light intensity of the zero order of diffraction of the second and third grating 32 and 33 is already reduced because of the central area 59 of the second beam combination mirror 52. Nevertheless, light of the zero order of diffraction should be transferred with similar intensity from various gratings 31 to 33 to the sample. Therefore, a light transmitting capacity of the central area 56 of the first beam combination mirror 51 is selected larger than 50%. For example, the central area 56 can transmit a ratio of light with a percentage that is double the one it can reflect. Thus, light 15 of the zero order of diffraction can be transferred with the same intensity from all three gratings 31 to 33 through the two beam combination mirrors 51, 52 in the direction of the sample plane 70.

The light, which is diffracted by various gratings, has particularly few overlapping areas in the pupil plane. Therefore, the beam combination mirrors 51, 52 are preferably arranged close to the pupil plane.

A united beam cross-section in the area of the pupil plane is illustrated schematically in the subject area 54 in FIG. 1. Hereby, light of the zero order of diffraction of all gratings 31 to 33 is visible in a central area. Six illuminated areas can be seen along a circumference around said central area, two of which in each case originate from the first order of diffraction of one of the three gratings 31 to 33. In said representation, it should be taken into account that light 15 is not guided to the individual gratings 31 to 33 simultaneously, but in succession. Consequently, only the central area as well as two areas, which are part of the first order of diffraction, are illuminated by the subject area 54 at any given time.

Light 15 can be guided further to a beam splitter 63 by way of lenses 61 and 62. The beam splitter 63 is preferably a color splitter 63, which is reflective for the light 15 of the light source 10. A lens changer can also be present, which is used to incorporate one of a plurality of color splitters into the beam path, depending on a used wavelength of the light source 10. The light 15 is guided to the object lens 65 through the color splitter 63, said object lens focusing the light 15 onto the sample plane 70. A sample 71 can be arranged there, which can be stimulated to become luminescent. Sample light emitted by the sample is in turn guided to the color splitter 63 by the object lens 65, the cutoff wavelength between transmission and reflection of said color splitter being selected such that sample light is transmitted. The sample light is then focused onto a detector device 80 with spatial resolution using a focusing lens 75.

It may be desirable that a direction of polarization of light 15 at the gratings 31 to 33 is maintained all the way to the sample plane 70. In this context, it is problematic that s and p ratios of polarized light are generally affected differently when they hit optical elements. The polarization of the light changes as a result. In order to minimize said effect, the beam splitter 63 and the beam combination mirrors 51, 52 and the mirror 53 are arranged in the shape of a periscope. Instead of the beam splitter 63, a different mirror can generally also be arranged in the beam path behind the components 51, 52, 53, in order to form a periscope together with them.

With the periscope, the light 15 is deflected at the beam splitter 63 into an opposite direction toward a direction of deflection at the beam combination mirrors 51, 52 and the mirror 53 because of the reflection of the light 15. In the illustrated example of FIG. 1, light is transferred from the gratings 31 to 33 at the beam combination mirrors 51, 52 and the mirror 53 to the right in the direction of the sample and at the beam splitter 63 to the left.

This helps counter an unwanted effect on the polarization at the components 51, 52, 53 by an opposite change in polarization at the beam splitter 63.

Selecting one of the three beam paths to the various gratings 31 to 33 allows the selection between various grating orientations. A phase shift is additionally required for the calculation of a high-resolution image on the basis of structured illumination. Adjustment devices can be provided for this purpose, which are capable of shifting and/or rotating the gratings 31 to 33 independently of each other. Alternatively, diffractive optical media 41 to 43 can be arranged in each case behind the gratings 31 to 33, wherein said media can also be referred to as rocking plate. The rocking plates 41 to 43 can be movable by way of adjustment devices and comprise for example a displaceable light-transmitting wedge or a tillable light-transmitting plate. Alternatively, each rocking plate 41 to 43 can also be formed by a liquid crystal area, whose liquid crystals are switchable between two or a plurality of settings. A phase shift of the structured illumination is achieved in every case, i.e. a representation of the grating lines is displaced in a direction diagonal to the gradient of the grating lines. At least three or at least five images of the sample 71 with different phase shift are preferably captured for every grating orientation and subsequently set off against each other.

To adjust the gratings 31 to 33 and/or the rocking plates 41 to 43, the adjustment devices require a phase shifting time. Said time is generally larger than a switching time of the deflection mirror 20 for switching between the various beam paths of the gratings 31 to 33. A measuring interruption time between the capture of two sample images can on principle be due to the switching duration of the deflection mirror 20 and/or to the phase shifting time.

Phase shifting preferably takes place in one beam path, while a further beam path to a further grating is illuminated. Thus, two sample images are not captured in direct succession across the same beam path with a different phase shift. In this case, a measurement interruption time would be determined by the phase shifting time. In fact, two sample images in direct succession are always captured across different beam paths.

This way, a measurement interruption time can be achieved, which is shorter than the phase shifting time and can in particular coincide with the switching duration of the deflection mirror 20.

Irrespective of the orientation and phase of the structured illumination, all sample images should be captured with the same light intensity. However, depending on the selected optical assembly 31 to 33, light 15 is guided across various optical fibers 26, 27, which generally result in different light losses, for example due to various coupling losses.

In order to still achieve identical exit intensities at the optical fibers 26, 27, the intensity can be adjusted by means of the AOTF 14. For this purpose, electronic control means 13 activate the AOTF 14 depending on a setting at the deflection mirror 20. As a result, the AOTF 14 weakens light more strongly if it is guided to an optical fiber with lower light losses.

The exemplary embodiment illustrated in FIG. 1 can be expanded by any number of further optical assemblies having their own beam path. These further optical assemblies in turn generate grating representations in other orientations. In so doing, light of said beam paths is also united on the common beam path by way of additional beam combination mirrors. In order to prevent that light 15 from one of the beam paths has to pass all beam combination mirrors, the beam combination mirrors can be divided into a plurality of rows rather than be arranged in a single row. The beam paths of the plurality of rows are then united by way of a beam combination mirror.

The light microscope 110 according to the invention and the optical arrangement 100 according to the invention enable switching between images of various grating orientations in a particularly short period of time. In so doing, light losses are small and the instrument-based expenditures can be kept at a relatively low level.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE LIST

10 Light source
12 Flight of mirror stairs having partially reflecting mirrors
13 Electronic control means
14 Acousto-optic tunable filter (AOTF)
15 Light
20 Deflection device, deflection mirror
22 Polarization-changing means, λ/2 plate
23 Polarizing cube beam splitter
24 Mirror
26, 27 Optical fibers
28, 29 Decoupling lenses of the optical fibers, collimators
30 Mirror
31 First optical assembly, first grating
32 Second optical assembly, second grating
33 Third optical assembly, third grating
34, 36 Polarization-changing means, λ/2 plate
35 Polarizing beam splitter
41, 42, 43 Phase plates
44, 45, 46 Focusing lenses
51, 52 First and second beam combination mirror
53 Mirror
54 Light intensity distribution behind the beam combination mirrors
55 Reflective areas of the first beam combination mirror
56 Partially reflecting central area of the first beam combination mirror
57 Light-transmitting area of the first beam combination mirror
58 Reflective areas of the second beam combination mirror
59 Partially reflecting central area of the second beam combination mirror
60 Light-transmitting area of the second beam combination mirror
61, 62 Lenses
63 Beam splitter, color splitter
65 Object lens
70 Sample plane
71 Sample
75 Focusing lens
80 Detector device
100 Lens arrangement
110 Light microscope

What is claimed is:

1. An optical arrangement configured to be positioned in a beam path of a light microscope, said optical arrangement comprising:
a light source for creating illuminating light,
at least a first and a second optical assembly for generating structured illumination light from said illuminating light,
an adjustable deflection mirror, from which different beam paths run to each of the at least said first and second optical assemblies, and which guides said illumination light along one of said different beam paths to said first or second optical assemblies and further in a direction toward a sample, said deflection mirror configured for guiding said illumination light along only one beam path at a time selected from among said different beam paths,
a first beam combination mirror provided for guiding said illumination light emerging from various optical assemblies to a common beam path in the direction of said sample, said first beam combination mirror having at least one distinctively defined reflective area, in which only illumination light from one of said first and second optical assemblies is incident upon, and
the first beam combination mirror having at least one distinctively defined light-transmitting optical area, in which only illuminating light from the other of said first and second optical assemblies is incident upon, wherein said illumination light is guided by said deflection mirror either to said at least one reflective area or to said at least one light-transmitting area.

2. The optical arrangement according to claim 1, wherein a grating for generating structured illumination light is arranged in a common beam path in front of the different beam paths to the various optical assemblies, and in that the optical assemblies in each case are an image field rotator, wherein structured illumination light in different orientations is provided with the image field rotators.

3. The optical arrangement according claim 1, in that the first beam combination mirror is arranged such that illumination light, which is diffracted into a zero order of diffraction and guided across the beam path of the first optical assembly is hitting a central area of the first beam combination mirror, and that illumination light, which is diffracted into a zero order of diffraction and guided across the beam path of the second optical assembly is hitting the central area, and in that the central area is partially reflecting.

4. The optical arrangement according to claim 1, in that the optical assemblies are image field rotators and/or gratings in various orientations to each other for generating grating representations of various orientations on the sample plane, wherein illumination light, which is diffracted in a first order of diffraction by the first grating, and illumination light, which is diffracted in a first order of diffraction by the second grating is hitting different areas on the first beam combination mirror because of the representation of various grating orientations, and in that said different areas are formed by the reflective areas and the light-transmitting areas, such that illumination light of the first order of diffraction is transferred in a direction of the sample plane by both the first grating as well as the second grating.

5. The optical arrangement according to claim 1, in that at least one phase plate adjustable to various settings in which it introduces a phase shift of structured illumination light that is provided by one of the optical assemblies.

6. The optical arrangement according to claim 1, further comprising an adjustable image field rotator in the beam path an object lens side of a combination mirror for changing an orientation of the structured illumination that is provided with the optical assemblies.

7. The optical arrangement according to claim 1, further comprising a zoom lens for adjusting an illumination of an object lens of a light microscope provided in the beam path an object lens side of a combination mirror.

8. The light microscope according to claim 1, wherein said first beam combination mirror further comprises a distinctively defined central area.

9. The optical arrangement according to claim 1, further comprising at least a third optical assembly for generating structured illumination light from incident light, and a second beam combination mirror is provided for guiding said light emerging from the second and third optical assembly onto a common beam path to the first beam combination mirror, said second beam combination mirror having reflective areas, in which only light from the second optical assembly is incident upon, and light-transmitting areas, in which only light from the third optical assembly is incident upon or vice versa.

10. The optical arrangement according to claim 9, in that the second beam combination mirror is arranged such that illumination light, which is diffracted into a zero order of diffraction and guided across the beam path of the second optical assembly is hitting the central area of the second beam combination mirror, and that illumination light, which is diffracted into a zero order of diffraction and guided across the beam path of the third optical assembly is hitting the central area of the second beam combination mirror, and in that the central area of the second beam combination mirror is partially reflecting, and in that the central area of the first beam combination mirror has a higher light transmitting capacity than the central area of the second beam combination mirror.

11. The optical arrangement according to claim 9, in that the reflective and the light-transmitting areas of the beam combination mirrors are arranged and light transmitting capacities of central areas of the beam combination mirrors are selected such that light losses on the beam combination mirrors in percent are equal relative to the input intensity for luminous beams of illumination light emerging from various optical assemblies.

12. The optical arrangement according to claim 1, wherein said optical assemblies in each case are a grating.

13. The optical arrangement according to claim 12, in that said first beam combination mirror is arranged in a plane, in which a light distribution is defined as Fourier transform of the light distribution on the gratings, or in that two beam combination mirrors are arranged on different sides of said plane, in which a light distribution from said gratings is defined as a Fourier transform of a light distribution on the gratings.

14. The optical arrangement according to claim 1, in that optical waveguides are provided for guiding illumination light from the deflection device to the optical assemblies.

15. The optical arrangement according to claim 14, in that the optical waveguides are polarization-conserving, in that each optical waveguide is arranged in an axial rotational orientation, wherein a direction of polarization of emerging illumination light is parallel to a direction of the grating rods of a grating, which the illumination light emerging from the respective optical waveguide is incident upon.

16. The optical arrangement according to claim 14, in that an acousto-optic device is provided on a light source side of the optical waveguides for varying an intensity of illumination light depending on which optical waveguide the illumination light is transferred to with the acousto-optic device, such that an identical light intensity is emitted with all optical waveguides or such that luminous beams emerging from various optical assemblies have the same light intensity behind the beam combination mirrors.

17. The optical arrangement according to claim 14, in that illumination light on a first as well as a second beam path is deflected to a first optical fiber by means of the deflection device, in that polarization-changing means are arranged in the first beam path for generating a direction of polarization of light, which is perpendicular to a direction of polarization of light on the second beam path, in that a polarizing cube beam splitter is provided for uniting the first and the second beam path, in that the first optical fiber is arranged such that the beam path united by the polarizing cube beam splitter hits the first optical fiber, and in that a polarizing beam splitter is arranged on an optical assembly side of the first optical fiber, which guides the illumination light depending on its direction of polarization onto a beam path to one of the optical assemblies or onto a further beam path to another of the optical assemblies.

18. A light microscope comprising a sample plane, a sample to be analyzed being positioned in said plane, at least one light source for emitting light in the direction of the sample plane, an optical arrangement according to claim 1 being provided between the light source and the sample plane.

19. The light microscope according to claim 18, wherein one beam combination mirror is arranged in a pupil plane, or wherein two beam combination mirrors are arranged on different sides of the pupil plane.

20. The light microscope according to claim 18, further comprising a partially reflecting mirror, which reflects illumination light emerging from the beam combination mirrors to a sample and transmits sample light emerging from the sample in the direction of a detector device, said beam combination mirrors and the partially reflecting mirror being arranged in the form of a periscope for maintaining a polarization of the illumination light.

* * * * *